July 24, 1962 H. B. DE VORE 3,046,441
INFRA-RED SENSITIVE TELEVISION CAMERA SYSTEM
Filed March 29, 1951
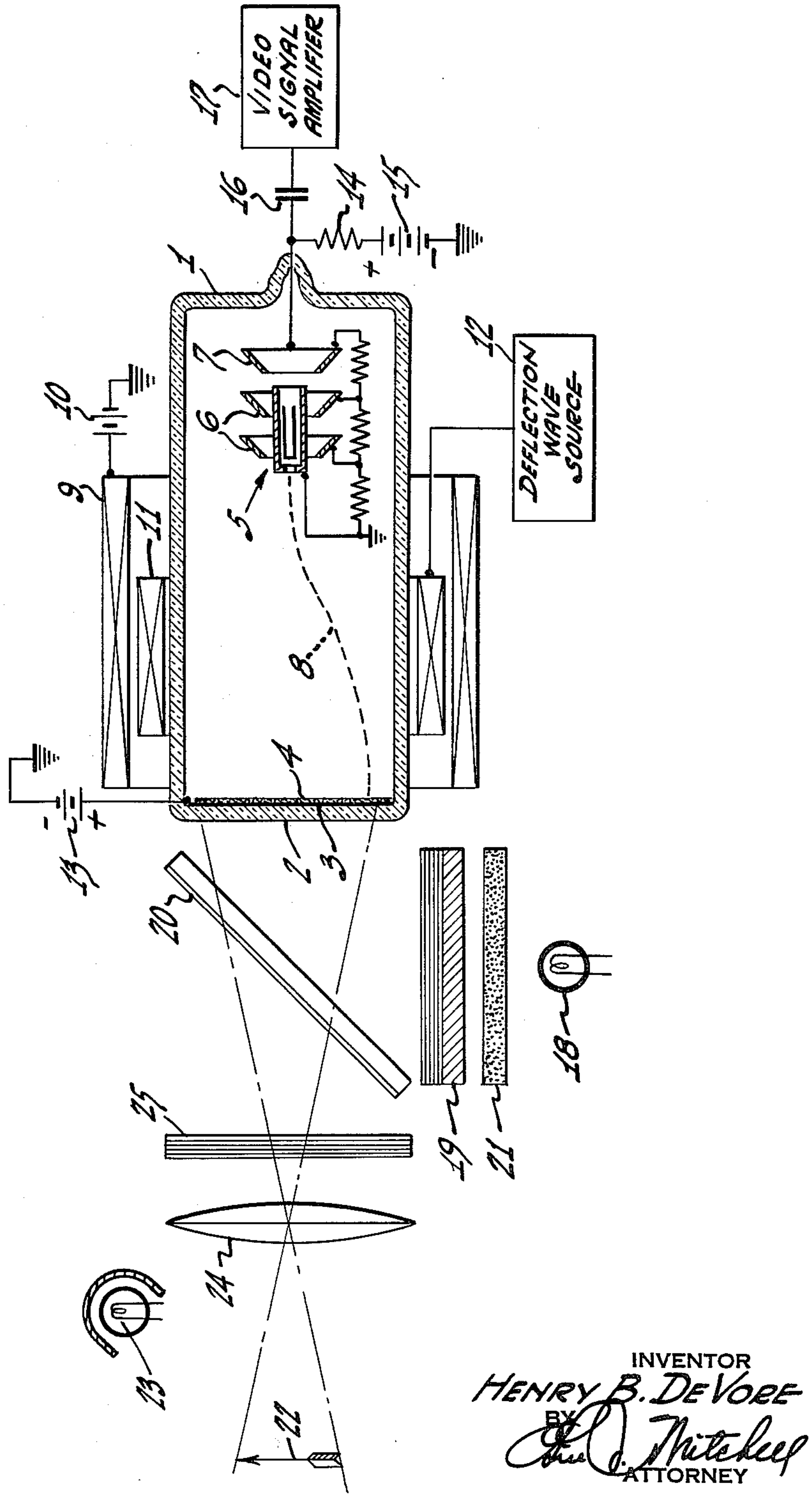
INVENTOR
HENRY B. DeVORE
BY
[signature]
ATTORNEY United States Patent Office
3,046,441
Patented July 24, 1962

3,046,441
INFRA-RED SENSITIVE TELEVISION CAMERA SYSTEM

Henry B. De Vore, Belle Mead, N.J., assignor to Radio Corporation of America, a corporation of Delaware Filed Mar. 29, 1951, Ser. No. 218,167
11 Claims. (Cl. 315—10)

This invention relates to television systems, and particularly to television camera systems capable of operating in a limited selected region of the light radiation frequency spectrum.

It is often desirable to be able to view objects which are not readily visible to the human eye. For example, an object which is a source of, or is exposed to, infra-red radiation may be effectively observed by means of a device which is more sensitive than the human eye to infra-red radiation. A successfully employed device of this character is an image tube which is described in such publications as one titled "The Electron Image Tube" by V. K. Zworykin, Broadcast News, April 1946. Such a tube has an electron emitting cathode which is responsive to infra-red radiation and the emission from which is employed to excite a luminescent screen which may be directly viewed.

The infra-red sensitivity of an image tube of this type, employing any of the known photoemissive materials as its cathode, is not very great and does not extend much beyond the visible region of the spectrum. Therefore, while camera tubes for the generation of video signals representative of normally visible objects and suitable for transmission to a remote point can be constructed, using photosensitive cathodes of this type, these tubes have not been satisfactory for operation with infra-red illumination.

Another known form of camera tube for the generation of video signals in response to visible radiation employs a sensitive surface which is photo-conductive. One such tube is described in an article titled "The Vidicon Photoconductive Camera" by P. K. Weimer, S. V. Forgue and R. R. Goodrich, Electronics, May 1950, p. 70. However, such a photo-conductive material, in order to be useful for this application, must have a high resistivity in the dark. Known materials which exhibit photo-conductivity when exposed to infra-red illumination, in general, have a dark resistance which is too low to be useful for this purpose.

Accordingly, it is an object of the present invention to provide a television system in which video signals are generated in response to radiation in a predetermined limited region of the light radiation frequency spectrum, and are representative of an image to be reproduced.

Another object of the invention is to provide a television system in which video signals are generated in response to infra-red radiation which is representative of an image to be reproduced.

In accordance with the invention, the television system is provided with a camera tube having a target electrode of such a character that its response is increased, or enhanced, by excitation with radiation in a first predetermined range of light radiation frequencies, and its response, so enhanced, decreased by excitation with simultaneously incident radiation having a second predetermined range of frequencies. Such a target electrode is uniformly irradiated with energy in the first range of frequencies. The target electrode also is excited by radiation representative of the image to be reproduced and having the second range of frequencies. The target electrode then is scanned for the production of video signals representative of the object.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

The single FIGURE of the drawing is a graphical representation of a camera tube and the mode of operating it in accordance with this invention.

Having reference to the drawing, there is shown a camera tube 1 provided with a plane transparent end wall 2, on the inner surface of which is disposed a translucent electrically conductive film 3. The photo-sensitive material, consisting in this case of cadmium sulfide crystals 4, is laid down on the inner surface of metallic layer 3, thereby forming a semiconductor type of target electrode, the conductivity of which changes in response to irradiation.

The tube also includes an electron gun 5 located generally at the end of the tube opposite to the target electrode. Also, in a manner which is conventional in certain types of camera tubes, an electron multiplier 6 having an output, or collector electrode 7, is provided in the region of the electron gun.

The general arrangement of the electrodes of the tube 1 is similar to that of the orthicon which is generally well-known and described in the literature, such as in an article title "The Orthicon, a Television Pick-Up Tube" by A. Rose and H. Iams, RCA Review, volume IV, No. 2, October 1939, page 186. In general, in this type of tube the electron beam represented at 8 is controlled so that, in the vicinity of the target electrode, it has a relatively low velocity and the electrons from the beam which are not required to restore the target electrode to equilibrium are returned to the region of the electron gun for amplification by the electron multiplier. The multiplied electrons are employed in a suitable output circuit to develop the video signals.

Also somewhat conventionally, the tube embodying the present invention is provided with an electromagnetic focusing coil 9 surrounding substantially the entire space between the electron gun and the target electrode. The focusing coil is energized by suitable means such as represented by the battery 10. In addition, an electromagnetic deflection yoke 11 is provided for controlling the scanning of the electron beam over the target electrode. The deflection yoke also is conventionally energized by means such as represented by the deflection wave source 12.

The target electrode is maintained at a suitable potential of positive polarity with respect to the electron gun by means such as represented by a battery 13 connected to the metallic film 3. Similarly, the video signal output circuit coupled to the collector electrode 7 and including a load resistor 14 is maintained at a suitable positive potential relative to the electron gun by means such as represented by a battery 15. The video signals developed in the output circuit of the tube are coupled by a capacitor 16 to any desired output circuit such as a video signal output amplifier 17.

Further, in accordance with another feature of the invention, the photo-conductive target electrode 4 is uniformly irradiated by light preferably having a wave length which is shorter than approximately 5200 Angstrom units. This irradiation may be effected by deriving light from a source such as indicated by the lamp 18 and which may be substantially of a panchromatic nature. The light from such a source is restricted to the desired region of the frequency spectrum by means of a suitable filter 19. In the present case this filter is a blue-green filter. The blue-green light passing the filter is reflected by a mirror 20. This mirror may be color selective, if desired, since it is required to reflect the blue-green light and to transmit the infra-red radiation. In order to effect the maximum uniformity of illumination of the target electrode by the green-blue light, it may be desirable to insert a diffusing screen 21 in the light path between the lamp 18 and the target electrode 4.

Also, the object 22, if not in itself a generator of infra-red radiation, may be illuminated by a source of infra-red radiation 23. The infra-red radiation derived from the object 22 is directed by a suitable optical system including a lens 24 and an infra-red transmitting filter 25 onto the target electrode 4 through the semi-transparent mirror 20.

The apparatus described operates substantially in the following manner. The photo-conductive target electrode 4 of the tube 1 is uniformly irradiated by blue-green light derived from the lamp 18 substantially in the manner described. As a result, its conductivity is materially increased, or enhanced, substantially uniformly throughout the entire surface area. At the same time, the infra-red radiation representative of the object 22 is projected onto the photo-conductive target electrode. This radiation varies in intensity in accordance with the detail of the object represented.

The infra-red radiation which excites the target electrode decreases its enhanced conductivity proportionately. For example, bright regions of the object produce infra-red radiation of substantial magnitude which causes the enhanced conductivity of the particular area of the target upon which it is directed to be decreased substantially. This effect is similar to a local decrease in intensity of the blue-green irradiation of the target electrode. Consequently, when such an area is scanned by the electron beam 8 a video signal is generated having a relatively small amplitude which is inversely proportional to the brightness of the infra-red object 22. Conversely, dark regions of the infra-red object cause a minimum decrease in the enhanced conductivity of the target electrode. Accordingly, the video signal which is produced by the scansion of such an area by the electron beam has a relatively large amplitude.

As a result, there are produced in the output circuit of the camera tube, video signals which represent a negative of the infra-red object. In order to obtain a positive reproduction of the object, it is merely necessary to convert the generated negative video signals to positive ones. This may be done in any manner well-known to those skilled in the art, such as by the provision of an additional stage of amplification in the video signal amplifier 17.

From the foregoing description of an illustrative embodiment of the invention, it may be seen that there is provided a television system in which video signals are generated to represent infra-red radiation derived from an object of which a visible reproduction is to be made. Furthermore, the visible reproduction of the object may be effected at a distance from the point at which the camera apparatus is located.

Having described an illustrative embodiment of the invention its scope is set forth in the following claims.

What is claimed is:

1. In a television system, a video signal generating tube having a photo-sensitive target electrode of semi-conductor material of the kind that its conductivity is increased in response to excitation by radiation having a first predetermined range of frequencies and said increased conductivity is reduced in response to excitation by radiation having a second predetermined range of frequencies, means for uniformly exciting said target electrode with radiation of said first predetermined range of frequencies, means for additionally exciting said target electrode with radiation having said second predetermined range of frequencies and representing an object, and means for scanning said target electrode to produce video signals representative of said object.

2. In a television system, a video signal generating tube having a photo-sensitive target electrode of semi-conductor material of the kind that its conductivity is increased in response to excitation by visible light and said increased conductivity is reduced in response to excitation by infra-red radiation, means for uniformly irradiating said target electrode with visible light to render it conductive, means for additionally projecting upon said target electrode infra-red radiation representative of an object, and means to scan said target electrode with an electron beam to produce video signals representative of said object.

3. In a television system as defined in claim 2 wherein, said first range of frequencies includes visible light having a wave length shorter than approximately 5200 Angstrom units and said second range of frequencies includes radiation in a band centered at approximately 9300 Angstrom units.

4. In a television system as defined in claim 2 wherein, said first range of frequencies includes radiation having a wave length shorter than approximately 5200 Angstrom units and said second range of frequencies includes radiation in a band centered at approximately 11,400 Angstrom units.

5. In a television system as defined in claim 2 wherein, said first range of frequencies includes radiation having a wave length shorter than approximately 5200 Angstrom units and said second range of frequencies includes radiation in bands centered respectively at approximately 9300 Angstrom units and 11,400 Angstrom units.

6. In a television system, a video signal generating tube having a photo-conductive target electrode of a semi-conductor material, said target electrode having the property of enhanced conductivity in response solely to visible light radiation and of decreased enhancement of conductivity in response to substantially concurrent excitation by infra-red radiation, means including a visible light source for uniformly irradiating said target electrode with light having a wave length shorter than approximately 5200 Angstrom units, means including an optical system for projecting onto said target electrode infra-red radiation representing an object, and means including an electron gun for scanning said target electrode with an electron beam to develop video signals representing said object.

7. In a television system as defined in claim 6, said visible light source being a source of substantially panchromatic light and said visible light irradiating means including a filter capable of passing only light having a wave length shorter than approximately 5200 Angstrom units.

8. In a television system as defined in claim 7 wherein, said visible light irradiating means includes a light diffusing member.

9. In a television system as defined in claim 8 wherein, said filter passes blue or blue-green light for irradiation of said target electrode.

10. In a television system as defined in claim 6 wherein, said visible light source produces substantially panchromatic light, said visible light irradiating means includes a blue-green filter, and said optical system includes an infra-red filter.

11. In a television system, a video signal generating tube having a photo-conductive target electrode comprising cadmium sulfide, means including a source of visible light for uniformly illuminating said target electrode, means for substantially concurrently exciting said target electrode with infra-red radiation representing an object, and means for generating an electron beam and deflecting it to scan said target electrode for the development of video signals representing said object.

References Cited in the file of this patent

UNITED STATES PATENTS

| | | |
|---|---|---|
| 2,107,782 | Farnsworth | Feb. 8, 1938 |
| 2,418,780 | Leverenz | Apr. 8, 1947 |